US011151264B2

(12) United States Patent
Yancey et al.

(10) Patent No.: US 11,151,264 B2
(45) Date of Patent: *Oct. 19, 2021

(54) METHOD AND SYSTEM FOR CONTROLLING ACCESS TO A MULTI-TENANT DATABASE SYSTEM USING A VIRTUAL PORTAL

(71) Applicant: salesforce.com, inc., San Francisco, CA (US)

(72) Inventors: Scott W Yancey, San Francisco, CA (US); Kedar Doshi, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/148,908

(22) Filed: May 6, 2016

(65) Prior Publication Data

US 2016/0253505 A1  Sep. 1, 2016

Related U.S. Application Data

(63) Continuation of application No. 12/132,409, filed on Jun. 3, 2008, now Pat. No. 9,361,366.

(51) Int. Cl.
*G06F 21/60* (2013.01)
*G06F 16/335* (2019.01)
*G06F 16/9535* (2019.01)
*G06F 16/27* (2019.01)
*G06F 21/62* (2013.01)

(52) U.S. Cl.
CPC ............ *G06F 21/604* (2013.01); *G06F 16/27* (2019.01); *G06F 16/335* (2019.01); *G06F 16/9535* (2019.01); *G06F 21/6218* (2013.01)

(58) Field of Classification Search
None
See application file for complete search history.

(56) References Cited

U.S. PATENT DOCUMENTS

| 5,072,370 A | 12/1991 | Durdik |
| 5,577,188 A | 11/1996 | Zhu |
| 5,608,872 A | 3/1997 | Schwartz et al. |

(Continued)

FOREIGN PATENT DOCUMENTS

WO  2004059420  7/2004

OTHER PUBLICATIONS

Office Action for U.S. Appl. No. 12/132,409, dated Oct. 1, 2013, 24 pages.

(Continued)

*Primary Examiner* — James Trujillo
*Assistant Examiner* — Kurt A Mueller
(74) *Attorney, Agent, or Firm* — Jaffery Watson Mendonsa & Hamilton LLP

(57) ABSTRACT

In accordance with embodiments, there are provided mechanisms and methods for controlling access to a multi-tenant database system using a virtual portal. These mechanisms and methods for controlling access to a multi-tenant database system using a virtual portal can enable embodiments to provide great flexibility to a tenant of the architecture to select the content that may be perceived by the tenant users while allowing the owner of the architecture control over the content.

19 Claims, 6 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,787,437 A | 7/1998 | Potterveld et al. |
| 5,794,232 A | 8/1998 | Mahlum et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,941,947 A * | 8/1999 | Brown et al. ............ 709/225 |
| 5,950,190 A | 9/1999 | Yeager et al. |
| 5,963,953 A | 10/1999 | Cram et al. |
| 5,974,409 A | 10/1999 | Sanu et al. |
| 5,987,471 A | 11/1999 | Bodine et al. |
| 6,064,656 A * | 5/2000 | Angal et al. ............ 370/254 |
| 6,085,191 A * | 7/2000 | Fisher et al. ............ 707/737 |
| 6,092,083 A | 7/2000 | Brodersen et al. |
| 6,112,198 A | 8/2000 | Lohman et al. |
| 6,169,534 B1 | 1/2001 | Raffel et al. |
| 6,178,425 B1 | 1/2001 | Brodersen et al. |
| 6,189,000 B1 | 2/2001 | Gwertzman et al. |
| 6,189,011 B1 | 2/2001 | Lim et al. |
| 6,216,135 B1 | 4/2001 | Brodersen et al. |
| 6,219,667 B1 * | 4/2001 | Lu et al. ............ 707/763 |
| 6,226,641 B1 * | 5/2001 | Hickson et al. |
| 6,233,617 B1 | 5/2001 | Rothwein et al. |
| 6,233,618 B1 * | 5/2001 | Shannon ............ 709/229 |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,330,560 B1 | 12/2001 | Harrison et al. |
| 6,336,137 B1 | 1/2002 | Lee et al. |
| 6,341,288 B1 | 1/2002 | Yach et al. |
| 6,345,288 B1 * | 2/2002 | Reed et al. ............ 709/201 |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,438,562 B1 | 8/2002 | Gupta et al. |
| 6,446,089 B1 | 9/2002 | Brodersen et al. |
| 6,446,109 B2 | 9/2002 | Gupta |
| 6,453,038 B1 | 9/2002 | McFarlane et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,578,037 B1 * | 6/2003 | Wong et al. ............ 707/694 |
| 6,601,087 B1 | 7/2003 | Zhu et al. |
| 6,604,117 B2 | 8/2003 | Lim et al. |
| 6,604,128 B2 | 8/2003 | Diec |
| 6,609,148 B1 | 8/2003 | Salo et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,658,417 B1 | 12/2003 | Stakutis et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,765 B2 | 4/2004 | Ghosh et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,839,608 B2 | 1/2005 | Liu et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,944,133 B2 | 9/2005 | Wisner et al. |
| 6,947,927 B2 | 9/2005 | Chaudhuri et al. |
| 7,076,633 B2 | 7/2006 | Tormasov et al. |
| 7,152,109 B2 | 12/2006 | Suorsa et al. |
| 7,174,483 B2 | 2/2007 | Worrall et al. |
| 7,185,192 B1 * | 2/2007 | Kahn ............ 713/155 |
| 7,206,805 B1 | 4/2007 | McLaughlin, Jr. |
| 7,206,807 B2 | 4/2007 | Cheenath |
| 7,209,929 B2 | 4/2007 | Dominguez, Jr. et al. |
| 7,249,118 B2 | 7/2007 | Sandler et al. |
| 7,305,577 B2 | 12/2007 | Zhang |
| 7,308,704 B2 * | 12/2007 | Vogel et al. ............ 726/2 |
| 7,340,411 B2 | 3/2008 | Cook |
| 7,373,364 B1 | 5/2008 | Chapman |
| 7,448,079 B2 | 11/2008 | Tremain |
| 7,484,219 B2 | 1/2009 | Mitra |
| 7,577,092 B2 | 8/2009 | San Andres et al. |
| 7,580,975 B2 | 8/2009 | Cheenath |
| 7,599,953 B2 | 10/2009 | Galindo-Lagaria et al. |
| 7,620,655 B2 | 11/2009 | Larsson et al. |
| 7,693,820 B2 | 4/2010 | Larson et al. |
| 7,814,470 B2 | 10/2010 | Mamou et al. |
| 7,921,299 B1 * | 4/2011 | Anantha ............ G06F 21/53 |
| | | 705/51 |
| 2001/0023440 A1 | 9/2001 | Franklin et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015578 A1 | 1/2004 | Karakashian et al. |
| 2004/0015981 A1 | 1/2004 | Coker et al. |
| 2004/0027388 A1 | 2/2004 | Berg et al. |
| 2004/0044656 A1 | 3/2004 | Cheenath |
| 2004/0045004 A1 | 3/2004 | Cheenath |

(56) References Cited

U.S. PATENT DOCUMENTS

| | | |
|---|---|---|
| 2004/0064503 A1 | 4/2004 | Karakashian et al. |
| 2004/0078371 A1* | 4/2004 | Worrall ............... G06F 16/954 |
| 2004/0111410 A1 | 6/2004 | Burgoon et al. |
| 2004/0128001 A1 | 7/2004 | Levin et al. |
| 2004/0143645 A1 | 7/2004 | Cheenath |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0220952 A1 | 11/2004 | Cheenath |
| 2004/0230895 A1 | 11/2004 | Elza et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0044396 A1* | 2/2005 | Vogel et al. ............... 713/200 |
| 2005/0050555 A1 | 3/2005 | Exley et al. |
| 2005/0065925 A1 | 3/2005 | Wiessman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0095960 A1 | 5/2006 | Arregoces et al. |
| 2006/0100912 A1 | 5/2006 | Kumar et al. |
| 2006/0136382 A1 | 6/2006 | Dettinger et al. |
| 2006/0206834 A1 | 9/2006 | Fisher et al. |
| 2007/0078705 A1 | 4/2007 | Abels et al. |
| 2007/0088741 A1 | 4/2007 | Brooks et al. |
| 2007/0124276 A1 | 5/2007 | Weissman et al. |
| 2007/0130130 A1 | 6/2007 | Chan et al. |
| 2007/0130137 A1 | 6/2007 | Oliver et al. |
| 2007/0150303 A1 | 6/2007 | Cheenath |
| 2007/0150546 A1 | 6/2007 | Karakashian et al. |
| 2007/0226640 A1 | 9/2007 | Holbrook et al. |
| 2008/0010243 A1 | 1/2008 | Weissman et al. |
| 2008/0077566 A1 | 3/2008 | Fell et al. |
| 2008/0082540 A1 | 4/2008 | Weissman et al. |
| 2008/0082555 A1 | 4/2008 | Salmon et al. |
| 2008/0082572 A1 | 4/2008 | Ballard et al. |
| 2008/0082986 A1 | 4/2008 | Cheenath et al. |
| 2008/0086358 A1 | 4/2008 | Doshi et al. |
| 2008/0086447 A1 | 4/2008 | Weissman et al. |
| 2008/0086479 A1 | 4/2008 | Fry et al. |
| 2008/0086482 A1 | 4/2008 | Weissman |
| 2008/0086514 A1 | 4/2008 | Weissman et al. |
| 2008/0086567 A1 | 4/2008 | Langen et al. |
| 2008/0086735 A1 | 4/2008 | Cheenath et al. |
| 2008/0126333 A1 | 5/2008 | Bezar et al. |
| 2008/0155310 A1 | 6/2008 | Langen et al. |
| 2008/0162544 A1 | 7/2008 | Weissman et al. |
| 2008/0201701 A1 | 8/2008 | Hofhansl et al. |
| 2008/0215560 A1 | 9/2008 | Bell et al. |
| 2008/0270354 A1 | 10/2008 | Weissman |
| 2008/0270987 A1 | 10/2008 | Weissman |
| 2009/0030906 A1 | 1/2009 | Doshi et al. |
| 2009/0049065 A1 | 2/2009 | Weissman |
| 2009/0049101 A1 | 2/2009 | Weissman |
| 2009/0049102 A1 | 2/2009 | Weissman |
| 2009/0049288 A1 | 2/2009 | Weissman |
| 2009/0276395 A1 | 11/2009 | Weissman et al. |
| 2009/0276405 A1 | 11/2009 | Wiessman et al. |
| 2009/0282045 A1 | 11/2009 | Hsieh et al. |
| 2009/0319529 A1 | 12/2009 | Bartlett et al. |
| 2010/0191719 A1 | 7/2010 | Weissman et al. |
| 2010/0211619 A1 | 8/2010 | Weissman et al. |
| 2010/0235837 A1 | 9/2010 | Weissman et al. |
| 2010/0274779 A1 | 10/2010 | Weissman et al. |

OTHER PUBLICATIONS

Final Office Action for U.S. Appl. No. 12/132,409, dated Mar. 11, 2011, 23 pages.
Final Office Action for U.S. Appl. No. 12/132,409, dated Sep. 16, 2014, 9 pages.
Office Action for U.S. Appl. No. 12/132,409, dated Sep. 9, 2010, 18 pages.
Office Action for U.S. Appl. No. 12/132,409, dated Aug. 26, 2015, 7 pages.
Notice of Allowance for U.S. Appl. No. 12/132,409, dated Feb. 5, 2016, 5 pages.
First named inventor: Calahan, Patrick, U.S. Appl. No. 12/954,556, filed Nov. 24, 2010.
First named inventor: Varadharajan, Arunkumaran, U.S. Appl. No. 12/909,820, filed Oct. 21, 2010[.
First named inventor: Pin, Oliver, U.S. Appl. No. 12/895,833, filed Sep. 30, 2010.
First named inventor: Press, William A., U.S. Appl. No. 12/850,502, filed Aug. 4, 2010.
First named inventor: Tanaka, Jay, U.S. Appl. No. 12/831,209, filed Jul. 6, 2010.
First named inventor: Tanaka, Jay, U.S. Appl. No. 12/831,196, filed Jul. 6, 2010.
First named inventor: Williams, Alexis, U.S. Appl. No. 13/028,236, filed Feb. 16, 2011.
Notification of Transmittal of the International Search Report and the Written Opinion of the International Searching Authority, or the Declaration. International Application No. PCT/US2010/050021. International Filing Date: Sep. 23, 2010.
Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.
Wermelinger et al: "Using coordination contracts for flexible adaptation to changing business rules", Proceedings of the Sixth International Workshop on Software Evolution, NJ, USA, Sep. 1, 2003, pp. 115-120.
Lee et al: "Composition of executable business process models by combining business rules and process flows", Expert Systems With Application, Oxford, GB, vol. 33, No. 1, Dec. 22, 2006, pp. 221-229.
Mietzer et al: "Combining Different Multi-tenancy Patterns in Service Oriented Applications", IEE International Enterprise Distributed Object Computing Conference, NJ, USA, Sep. 1, 2009, pp. 131-140.
Wang et al: "Integrated Constraint Violation Handling for Dynamic Services Composition", IEE International Conference on Services Computing, NJ, USA, Sep. 21, 2009, pp. 168-175.
First named inventor: Yancey, Scott, U.S. Appl. No. 12/636,658, filed Dec. 11, 2009.
First named inventor: Yancey, Scott, U.S. Appl. No. 12/636,675, filed Dec. 11, 2009.
First named inventor: Yancey, Scott, U.S. Appl. No. 12/720,538, filed Mar. 9, 2010.
First named inventor: Durdik, Paul, U.S. Appl. No. 12/369,710, filed Feb. 11, 2009.
[Online];[published on Oct. 17, 2008];[retrieved on Feb. 26, 2010]; retrieved from http://en.wikipedia.org/wiki/Push_technology.
[Online];[published on Oct. 16, 2008];[retrieved on Feb. 26, 2010]; retrieved from http://en.wikipedia.org/wiki/Customer_Realtionship_Management.
[Online];[published on Apr. 22, 2008];[retrieved on Feb. 26, 2010]; retrieved from http://en.wikipedia.org/wiki/Flat_file_database.
[Online];[published on Apr. 25, 2008];[retrieved on Feb. 26, 2010]; retrieved from http://en.wikipedia.org/wiki/Relational_database.
First named inventor: Doshi, Kedar, U.S. Appl. No. 12/167,991, filed Jul. 3, 2008.
First named inventor: Yancey, Scott, U.S. Appl. No. 12/197,979, filed Aug. 25, 2008.
First named inventor: Smith, Andrew, U.S. Appl. No. 12/369,710, filed Feb. 11, 2009.
First named inventor: Bezar, Eric, U.S. Appl. No. 12/569,603, filed Sep. 29, 2009.
First named inventor: Durdik, Paul, U.S. Appl. No. 12/549,349, filed Aug. 27, 2009.

(56) References Cited

OTHER PUBLICATIONS

First named inventor: Durdik, Paul, U.S. Appl. No. 12/092,721, filed Aug. 28, 2008.

* cited by examiner

METHOD AND SYSTEM FOR CONTROLLING ACCESS TO A MULTI-TENANT DATABASE SYSTEM USING A VIRTUAL PORTAL

CROSS REFERENCE TO RELATED APPLICATIONS

This continuation application is related to, and claims priority to, U.S. patent application Ser. No. 12/132,409, entitled "METHOD AND SYSTEM FOR CONTROLLING ACCESS TO A MULTI-TENANT DATABASE SYSTEM USING A VIRTUAL PORTAL" filed on Jun. 3, 2008, which is hereby incorporated by reference herein as though set forth in full.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to virtual portals used in a multi-tenant on demand architecture in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The efficient retrieval of accurate information and subsequent delivery of this information to the user system has been and continues to be a goal of administrators of database systems.

Unfortunately, conventional database approaches might become inefficient if, for example, updating applications on the server if the relationship is relatively complex. A database system may also process a query relatively slowly if, for example, a relatively large number of users substantially concurrently access the database system.

Accordingly, it is desirable to provide techniques enabling an owner of the database system, to improve the ease of use of the database system.

BRIEF SUMMARY

In accordance with embodiments, there are provided techniques for controlling access to a multi-tenant database system using a virtual portal. These mechanisms and methods for controlling access to a multi-tenant database system using a virtual portal can enable embodiments to provide great flexibility to a tenant of the architecture to select the content that may be perceived by the tenant users while allowing the owner of the architecture control over the content.

In an embodiment and by way of example, a method of controlling access to a multi-tenant database system using a virtual portal is described. The method embodiment includes receiving from a first tenant, a request to permit at least one first tenant user to access a sub-portion of that portion of content authorized to the first tenant stored along with content authorized only to other tenants to form a multi-tenant database system, access to which database is provided to the first tenant and the other tenants on-demand. A portal display registry portion, corresponding to the first tenant, is configured to authorize at least one first tenant user to be permitted access to certain kinds of information. The first tenant user is permitted to perceive the sub-portion of that portion of content authorized to the first tenant through a portal, the sub-portion being defined by the portal display registry included with the multi-tenant database system, thereby facilitating access to a sub-portion of the first tenant's portion of content of the multi-tenant database system using an architecture common to the first tenant and to the first tenant user accessing through the portal.

The present invention is described with reference to an embodiment in which techniques for controlling access to a multi-tenant on demand architecture using a virtual portal. The application server provides a front end for an on-demand database service capable of supporting multiple tenants, the present invention is not limited to multi-tenant database systems nor deployment on application servers. Embodiments may be practiced using other database architectures, i.e., ORACLE®, DB® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE. DRAWINGS

In the following drawings like reference numbers are used to refer to like elements. Although the following figures depict various examples of the invention, the invention is not limited to the examples depicted in the figures.

DETAILED DESCRIPTION

Systems and methods are provided for controlling access to a multi-tenant database system using a virtual portal. As used herein, the term multi-tenant database system (MTS) refers to those systems in which various elements of hardware and software of the database system may be shared by one or more users. For example, a given application server may simultaneously process requests for a great number of customers, and a given database table may store rows for a potentially much greater number of customers.

Figure 1:
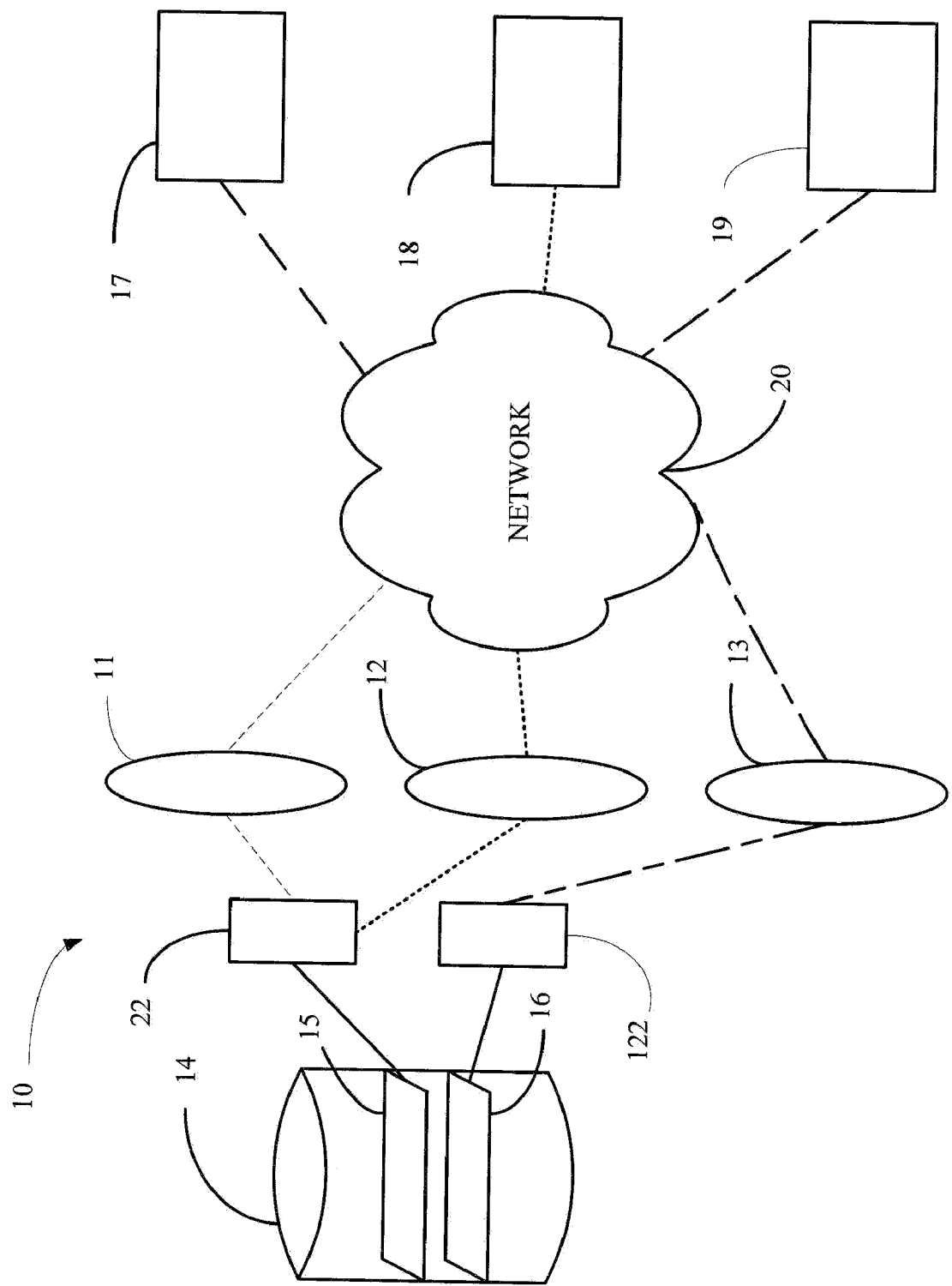
FIG. 1 illustrates a representative architecture for coil trolling access to a multi-tenant database system using a virtual portal in an embodiment.

FIG. 1 illustrates a database architecture 10 employing virtual portals 11, 12 and 13 in an MTS architecture that affords access to a database 14 having tenant information 15 and 16, associated with a tenant, by multiple users 17-19 over a data communication network 20. Architecture 10 includes information corresponding to more than one tenant, with the understanding that a tenant is an organization that obtains rights to store information on database 14 and make the same accessible to one or more users 17-19 to whom tenant provides authorization. This is typically achieved by rental agreements between the tenant and an owner/provider of architecture 10. In this manner, architecture 10 provides an on-demand database service to users 17-19 that are not necessarily be concerned with building and/or maintaining the database system; rather, these functions are addressed between the tenant and the owner/provider. Tenant information 15 and 16 may include software applications, application data, and the like. Although information corresponding to two different tenants is shown, in practice information corresponding to any number of tenants may be present.

Each virtual portal 11, 12 and 13 provides an "instance" of a portal user interface, coupled to allow access to database 14. With architecture 10, multiple users 17-19 may access information on database 14 through a common network address, in this example a universal resource locator (URL). In response web-pages and other content may be provided to users 17-19 over network 20. The resources of database 14 that users 17-19 may access can be different, depending on user's 17-19 security or permission level and/or tenant association. For example, in some MTSs, tenants may be allowed to provide users 17-19 associated with the tenant, referred to as tenant users, access to a sub-portion of the content of the database information that the tenant may be allowed to access. The sub-portion that any one of tenant users may access may be the same as or different from the sub-portion that the remaining tenant users may access. User's not associated with a tenant would not be allowed access to the tenant information. For example, assume users 17 and 18 are associated with the tenant corresponding to tenant information 15 and not associated with the tenant corresponding to tenant information 16. Users 17 and 18 would not be allowed access to tenant information 16 and would be allowed access to tenant information 15. Similarly, were user 19 associated with the tenant corresponding to tenant information 16 and not the tenant corresponding to tenant information 15, user 19 would be allowed to access tenant information 16 and not tenant information 15. It is possible, however, that one of users 17-19 are associated to the tenants corresponding to both sets of tenant information 15 and 16.

Data communication network 20 may be any network or combination of networks of devices that communicate with one another. For example, network 20 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global inter-network of networks often referred to as the "Internet" with a capital "I," that network will be used in many of the examples herein. However, it should be understood that the networks that the present invention might use are not so limited, although TCP/IP is a frequently implemented protocol. As a result, users 17-19 may access the corresponding tenant information 15 and 16 from any location where network access is available.

An example of a tenant may be a company that employs a sales force where each salesperson uses server system 30 to manage their sales process. In this fashion, architecture facilitates Customer Relations Management (CRM). Thus, one or more of users 17-19 may be a salesperson that maintains information that is applicable to that salesperson's sales process and is different from information related to other salespersons' sales process. An example of sales process data may include, without limitation, contact data, leads data, customer follow-up data, performance data, goals and progress data applicable to that salesperson's personal sales process. The sales process information may be stored in tenant data storage 24. To facilitate management of this information, the tenant associated with the salesperson may restrict each salesperson access to specific sales process information. A tenant, however, may be able to view all sale process information for the salespersons associated therewith. This is referred to as a hierarchical data structure in which users at one permission level, in this example a tenant, may have access to applications, data, and database information, accessible by a lower permission level user, in this example the salespersons, with the salesperson not having access to certain applications, database information, and data accessible by a user at a higher permission level, the tenant. In this fashion, the tenant may access all information that the tenants' user could access, in this example, salespersons; however, the tenant's user, in the present example a salesperson, is not necessarily allowed to access information of the tenant. Similarly, an administrator of the architecture 10 may access and, control all information available to each of the tenants, as well as the tenant users associated with each tenant.

Tenant information 15 and 16 may viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, were database 14 a CRM database it would include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

To facilitate the hierarchical data structure, virtual portals 11, 12 and 13 each provides the functions to process queries from multiple different users. To this end, virtual portals 11, 12 and 13 facilitates restricting the resources of database 14 that a tenant may provide to users 17-19 associated with the tenant. Each user 17-19 logs into one of virtual portals 11, 12 and 13 to access resources of database 14 through a unique uniform resource locator (URL) or other type of address. Based on the URL and other identifying information associated with users 17-19, architecture 10 may determine the resources of database 14 users 17-19 may access. For example, user 17 communicates with database through virtual portal 11, user 18 communicates with database 14 through virtual portal 12, and user 19 communicates with database through virtual portal 13. It is possible, however, that all users 17-19 may use a common portal, as well. To that end, users desiring to access resources of database 14 employ virtual portals 11, 12 and 13 to validate against the information stored on system 10, corresponding to the user 17-19 requesting access.

One advantage of the hierarchical data structure allows a tenant to customize the resources that users 17-19 may access, as well as the web-pages and other rendering that the tenant users 17-19 may experience when accessing the resources of database 14. This may be achieved, by tenant creating custom objects. Techniques for creating custom objects in a multi-tenant database system is disclosed in U.S. patent application Ser. No. 10/817,161, filed Apr. 2, 2004, entitled "Custom Entities and Fields in a Multi-Tenant Database System", which is incorporated herein by reference. In certain embodiments, for example, all custom entity data rows are stored in a single multi-tenant physical table, which may contain multiple logical tables per organization. It is transparent to tenants that multiple "tables" associated therewith are in fact stored in one large table or that their data may be stored in the same table as the data of other tenants. In part, this customization may be provided by a tenant modifying common interface components, such as, a login screen, a system error screen, a paging user interface, branding information, and the like. This allows, for example, the tenant to vary the "look and feel" of the computing experience of users 17-19. It is desired, however, that the owner of database 14 control resources, as well as the look-and-feel that the tenant may provide to users 17-19. Otherwise, this may result in the tenant's users have access equal to the tenant. This is undesirable from a business perspective.

The owner/provider of database 14 maintains control over the resources, as well as, the look-and-feel of the computing experience a tenant may provide to users 17-19 through the use of one or more portal display registries (PDR) 22 and 122. To that end, PDRs 22 and 122 each includes exceptions to the experience of users 17-19. Communication with database 14 through virtual portals 11, 12 and 13 occurs in coordination with the functions of PDRs 22 and 122. The resources and content to be provided to users 17-19 is compared to information in the appropriate PDRs 22 and 122 to determine whether the resources and content is appropriate. In this manner, PDRs 22 and 122 function as a gateway and identifies and restricts the resources and content may be provided to users 17-19, even though the same resources and content may be provided to the tenant that users 17-19 are associated. The tenant may control, subject to the restrictions of the provider/owner of database 14, the computing experience of tenant users 17-19. To that end, relational database management system (RDMS) or the equivalent may execute storage and retrieval of information against the database object(s). In the present example, each set of tenant information is uniquely associated with a separate PDR 22 and 122. Tenant information 15 is associated with PDR 22, and tenant information 16 is associated with PDR 122. Assuming that users 17 and 18 are associated with a tenant corresponding to tenant information 15 and user 19 is associated with the tenant corresponding to tenant information 16. Requests for access to database 14 would be transmitted via virtual portals 11 and 12, respectively. In response to the request a sub-portion of tenant information 15, which is the subject of the request transmitted to users 17 and 18. However, this is subject to the restrictions set forth in PDR 22. Thus, all content transmitted to users 17 and 18 are subject to the restrictions set forth in PDR 22. Similarly, all content transmitted from database 14 to user 19 is subject to the restrictions set forth in PDR 122. Requests from user 19 for a sub-portion of tenant information 16 occur through virtual portal 13.

Were it determined that the resources and content to be provided to users 17-19 was improper, in one embodiment architecture 10 would merely restrict this information from being made available to users 17-19. The remaining resources and content that are the subject of the users 17-19 request for access would be provided. The tenant associated with the users 17-19 could be made aware of that one or more of users 17-19 had attempted to access resources of database 14 that users 17-19 were not authorized to access. This may be achieved, for example, through owner/provider transmitting an e-mail message, an instant message, and/or a letter to the address of tenant. Of course, notification to the tenant by the owner/provider may be avoided altogether. Alternatively, were it determined that the resources and content to be provided to users 17-19 was improper, architecture 10 would restrict any resources of database 14 from being accessed by the users 17-19 requesting access, including resources and content that would otherwise be proper for the requesting user 17-19 to access. Notification to the tenant of the situation may or may not occur as discussed above.

Figure 2:
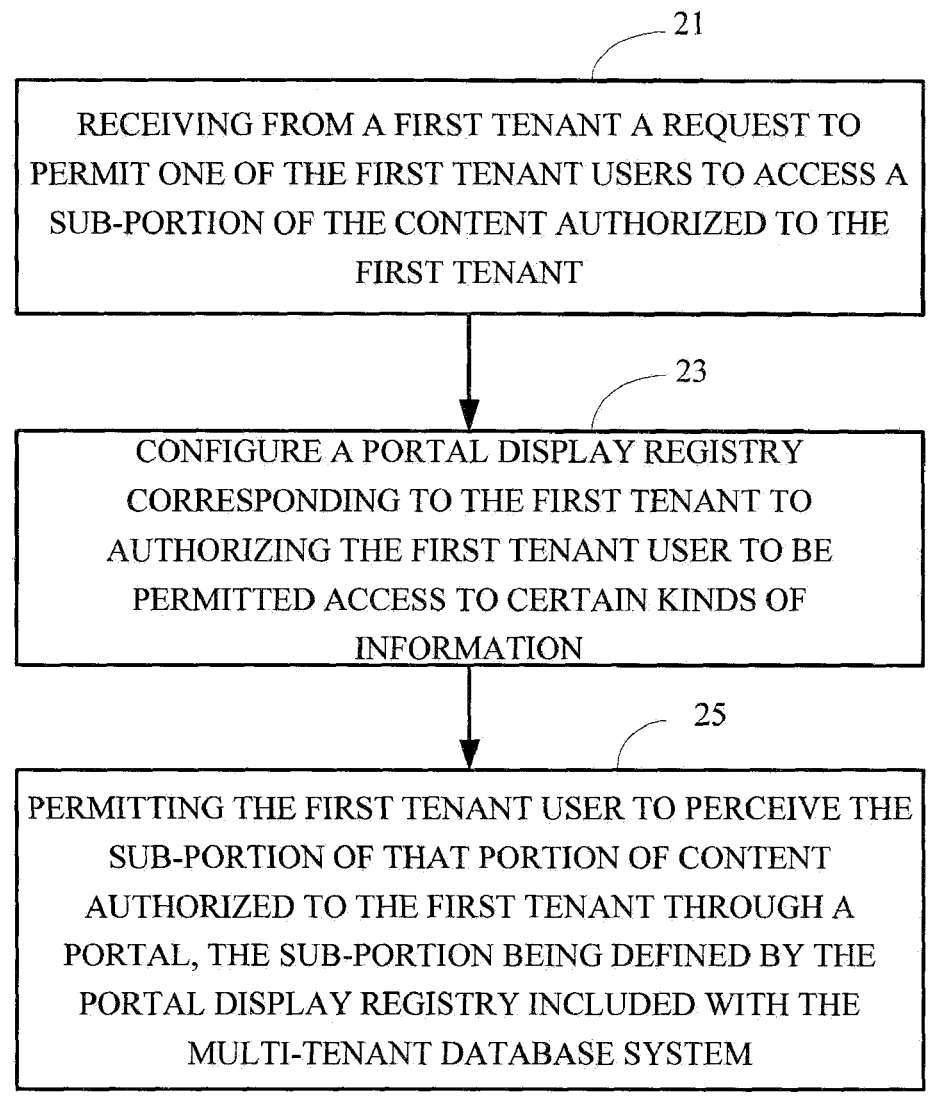
FIG. 2 is an operational flow diagram illustrating a high level overview of a method controlling access to a multi-tenant database system using a virtual portal in an embodiment.

Referring to FIGS. 1 and 2, in operation architecture would receive, from a first tenant, a request to permit one of users 17-19 to access a sub-portion of the content contained on data base 14, at function 21. The content with which the sub-portion is associated is that portion of the total content of database that the tenant in authorized to grant access. In the present example it is presumed that the tenant is associated with tenant information 15. At function PDR 22 would be configured to authorize one of users 17-19 to access to certain kinds of information amongst the sub-portion. PDR would usually be configured by the owner/provider and the kinds of information may be any information desired. The information that the owner/provider would allow users 17-19 would typically depend upon the desires of the owner/provider and could be subject to contract negotiations with the tenant associated with tenant information 15. At function 25 the tenant user 17-19 would be permitted to perceive the sub-portion of that portion of content authorized to the first tenant through virtual portal 12.

Figure 3:
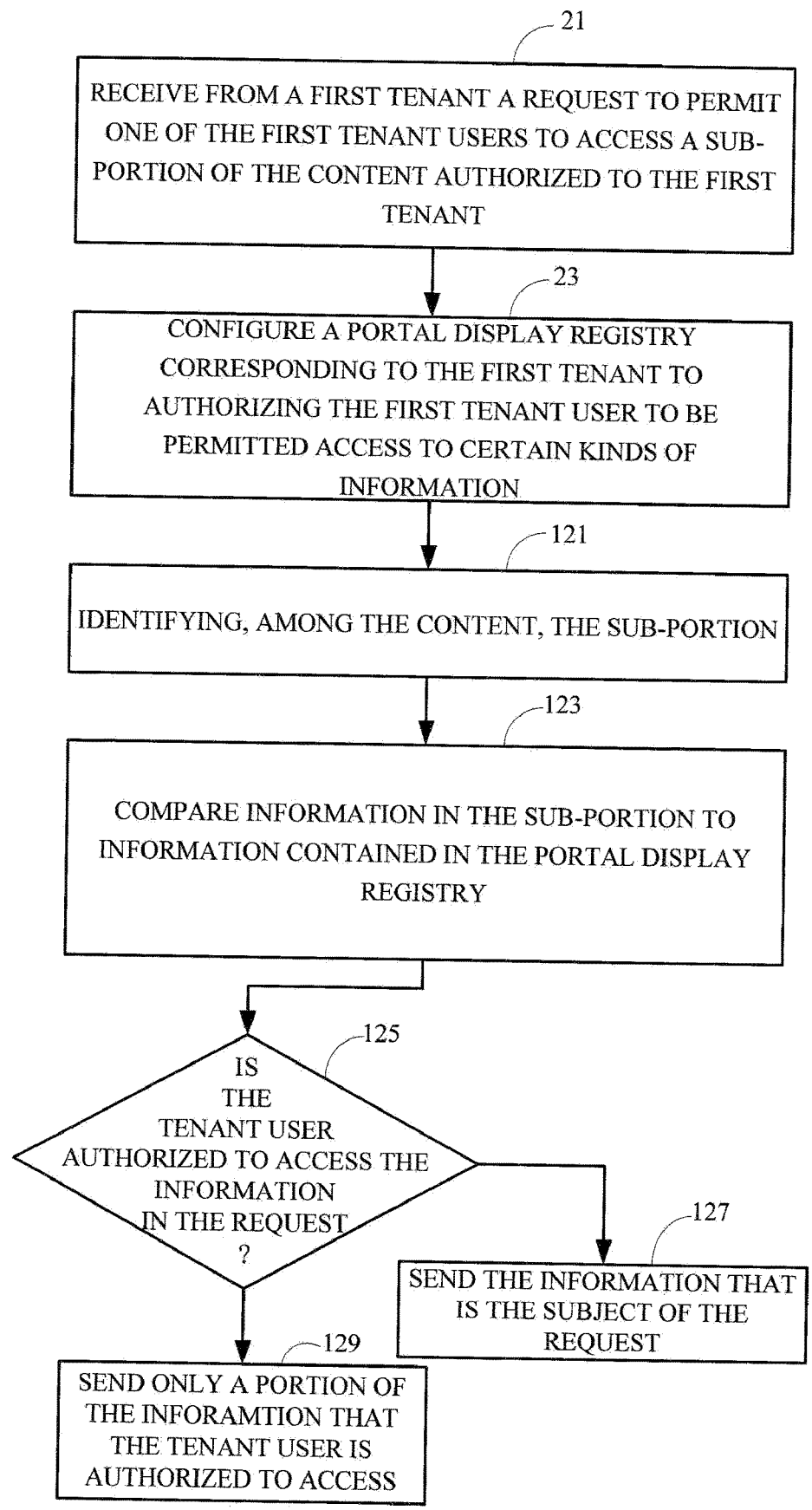
FIG. 3 is a detailed operational flow diagram illustrating additional functions carried-out in the operational flow diagram of FIG. 2.

Referring to both FIGS. 2 and 3, details of function 25 are shown in further detail. Specifically, after function 23, function 121 is carried out during which the sub-portion of the content that the tenant is authorized to access is identified. At function 123, the information in the sub-portion is compared to the information contained in PDR 22. At function 125 it is determined whether the tenant user 17-19 is authorized to access the information in the request. If yes then function 127 is carried-out during which the information that was the subject of the request is transmitted. Otherwise, function 129 is carried-out wherein only that portion of the information to which the tenant user 17-19 may access is transmitted. In an alternative embodiment, a notification of denial to access to a portion of the information may be transmitted, as discussed above.

Figure 4:
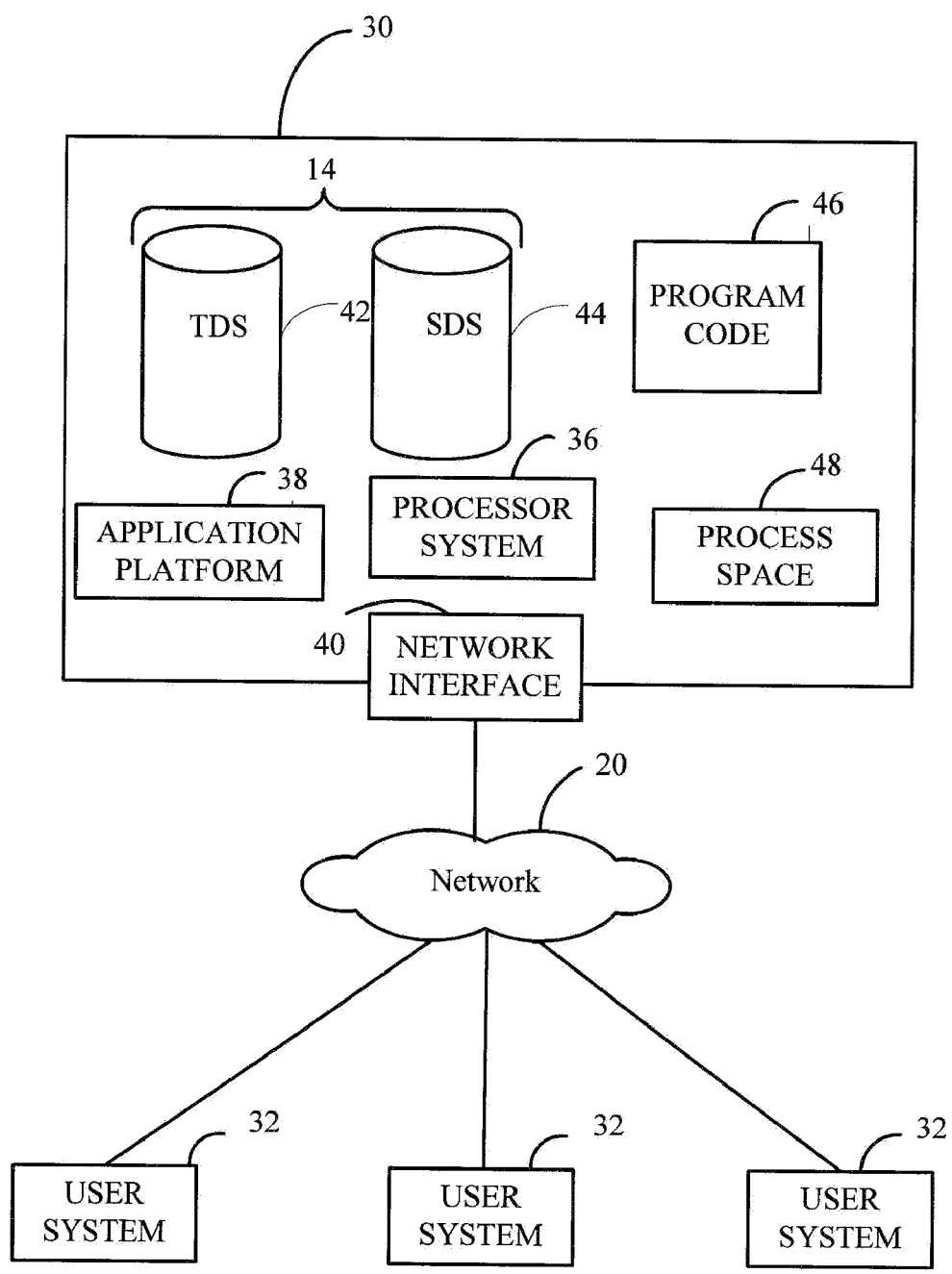
FIG. 4 illustrates a block diagram of an example of representative system in which the architecture, shown in FIG. 1. may be practiced.
Figure 5:
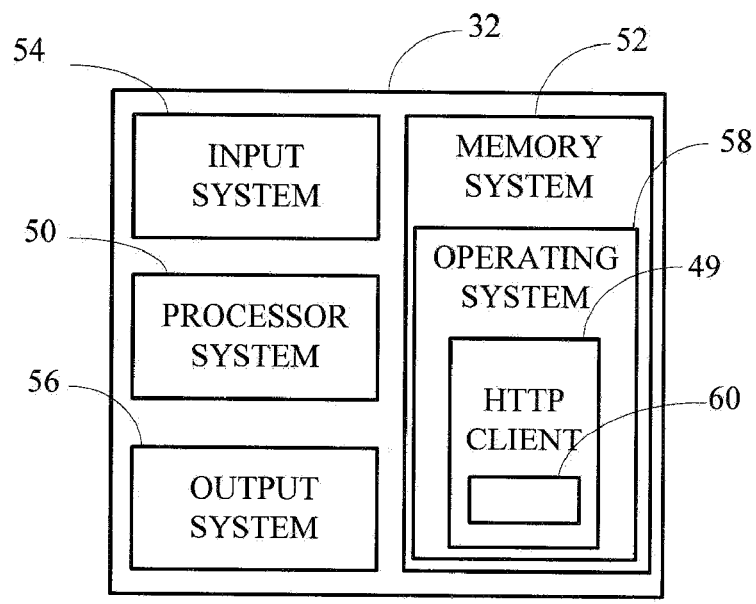
FIG. 5 is a detail block diagram of a user system, shown in FIGS. 1 and 4.

Referring to FIGS. 1, 4 and 5 a block diagram of a server system 30 employed to implement architecture 10 is shown as including multiple user systems 32 in data communication with server system 30 over network 20. Server system 30 includes a processor system 36, application platform 38, network interface 40, database 14, which includes tenant data storage 42, system data storage 44. In addition server system 30 includes program code 46, and process space 48. Program code 46 may include, among other code, code to facilitate a tenant to control the look-and-feel of the experience users 17-19 have when accessing database 14. Process space 48 facilitates execution of MTS system processes and tenant-specific processes, such as running applications as part of an application hosting service. Additional processes that may execute on server system 30 include database indexing processes. In other embodiments, server system 30 may not have all of the components listed and/or may have other elements instead of, or in addition to, those listed above. Server system 30, and additional instances of an MTS, where more than one is present, and all components thereof may be operator configurable using applications including computer code to run using a central processing unit such as processor system 36, which may include an Intel Pentium® processor or the like, and/or multiple processor units.

Application platform 38 may be a framework that allows the applications of architecture 10 to run, such as the hardware and/or software, e.g., the operating system. In an embodiment, application platform 38 may enable creation, managing and executing one or more applications developed by the owner/provider of architecture 10, users 17-19 accessing architecture 10 via user systems 32, or third party application developers accessing architecture 10 via user systems 32.

In one embodiment, server system 30 implements a web-based customer relationship management (CRM) system. For example, in one embodiment, server system 30 includes application servers configured to implement and execute CRM software applications as well as provide related data, code, forms, webpages and other information to and from user systems 32 and to store to, and retrieve from, a database system related data, objects, and Webpage content. Architecture 10 typically stores data for multiple tenants in the same physical database object, however, tenant data typically is arranged so that data of one tenant is kept logically separate from that of other tenants so that one tenant does not have access to another tenant's data, unless such data is expressly shared. In certain embodiments, server system 30 implements applications other than, or in addition to, the CRM application discussed above. For example, server system 30 may provide tenant access to multiple hosted (standard and custom) applications, including a CRM application. User (or third party developer) applications, which may or may not include CRM, may be supported by the application platform 38, which manages creation, storage of the applications into one or more database objects and executing of the applications in a virtual machine in the process space of server system 30.

To facilitate web-based CRM, user systems 32 might communicate with server system 30 using TCP/IP and, at a higher network level, use other common Internet protocols to communicate, such as HTTP, FTP, AFS, WAP, etc. To that end, user systems 32 may be any computing device capable of interfacing directly or indirectly to the Internet or other network connection, such as desktop personal computer, workstation, laptop, PDA, cell phone, or any wireless access protocol (WAP) enabled device and the like running an HTTP client 49. An example of a user system 32 includes a processor system 50, a memory system 52, an input system 54, and output system 56. Processor system 50 may be any combination of one or more processors. Memory system 52 may be any combination of one or more memory devices, short term, and/or long term memory. A portion of memory system is used to run operating system 58 in which HTTP client 49 executes. Input system 54 may be any combination of input devices, such as one or more keyboards, mice, trackballs, scanners, cameras, and/or interfaces to networks. Output system 56 may be any combination of output devices, such as one or more monitors, printers, and/or interfaces to networks. HTTP client 49 allows users 17-19 of users systems 32 to access, process and view information, pages and applications available to it from server system 30 over network 20. Examples of HTTP client 49 include various browsing applications, such as Microsoft's Internet Explorer browser, Netscape's Navigator browser, Opera's browser, or a WAP-enabled browser in the case of a cell phone, PDA or other wireless device, or the like. Access is gained to requisite tenant information 15 and 16 by entering the URL (not shown) into the URL box 60 of HTTP client 49. The URL directs users 17-19 to the appropriate virtual portal for to determine authorization and permission level to access the requisite tenant information.

Data corresponding with each user 17-19 may be separate from the data corresponding to the remaining users 17-19 regardless of the tenant associated with users 17-19; however, some data might be shared or accessible by a plurality of users 17-19 or all of users 17-19 associated with a tenant. Thus, there might be some data structures managed by server system 30 that are allocated at the tenant level while other data structures might be managed at the user level. Because an MTS typically support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, server system 30 might also maintain system level data usable by multiple tenants or other data. Such system level data might include industry reports, news, postings, and the like that are sharable among tenants.

According to one embodiment, server system 30 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
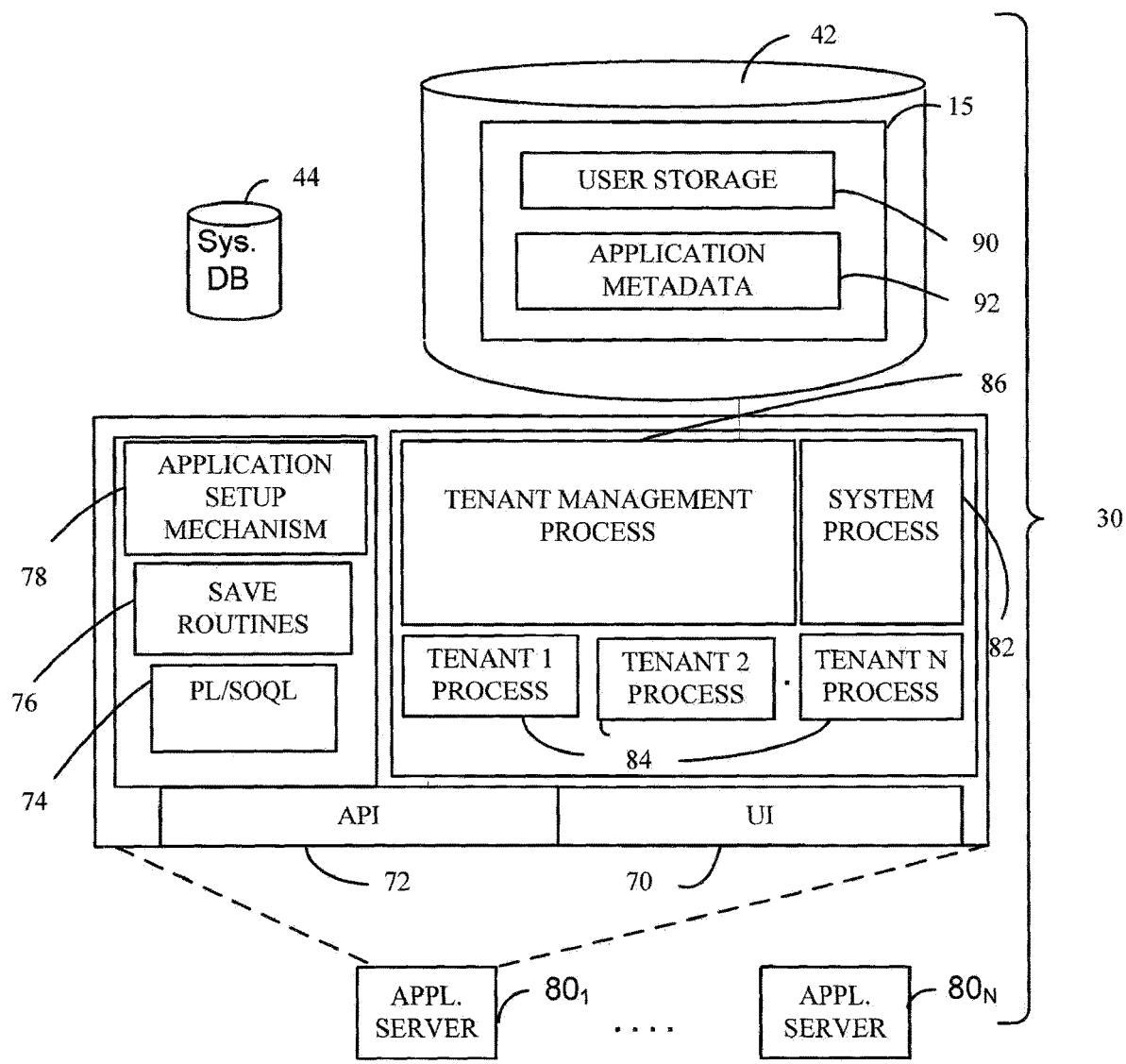
FIG. 6 illustrates a block diagram of an embodiment of elements of FIG. 4 and various possible interconnections between these elements.

Referring to FIG. 6, a specific embodiment of a server system 30 may include tenant data storage 42 and system data storage 44, which are as discussed above. In addition, server system 130 includes a user interface (UI) 70, application program interface (API) 72, PL/SOQL 74, save routines 76, an application setup mechanism 78, applications servers $80_1$-$80_N$, system process space 82, tenant process spaces 84, tenant management process space 86, tenant information 88, user storage 90, and application metadata 92. In other embodiments, server system 30 may not have the same elements as those listed above and/or may have other elements instead, of, or in addition to, those listed above. Network interface is implemented as a plurality of HTTP application servers $80_1$-$80_N$. Also shown is system process space 82, including individual tenant process spaces 84 and a tenant management process space 86.

Referring to both. FIGS. 4 and 6, each application server $80_1$-$80_N$ may be configured to serve requests of user systems 32 for access to tenant data storage 42 and the tenant information 15 and 16, as well as data system storage 44. Tenant information 15 and 16 consists of different information storage areas that may physical differentiation, e.g., different hard disks, and/or a logical separation of the information. Within each tenant storage area 16 and 17, information may be included therein that consists of user storage 90 and application metadata 92 for each user or a groups of users. For example, a copy of a user's most recently used (MRU) items might be stored to user storage 90. Similarly, a copy of MRU items for an entire organization that is a tenant might be stored to tenant storage area 88. UI 70 provides a user interface and API 72 provides an application programmer interface to server system 30 resident processes to users and/or developers at user systems 32. The tenant data and the system data may be stored in various databases, such as one or more Oracle™ databases.

It is not necessary that the one or mote HTTP application servers $80_1$-$80_N$ be implemented as the sole network interface between server system 30 and network 20. Rather, other communication techniques might be used in conjunction with HTTP application servers $80_1$-$80_N$ or in lieu thereof. In some implementations, the interface between server system 30 and network 20 includes load sharing functionality, such as round-robin HTTP request distributors to balance loads and distribute incoming HTTP requests evenly over a plurality of servers. At least as for users 17-19 one of HTTP application servers $80_1$-$80_N$, each of the plurality of servers has access to the MTS data; however, other alternative configurations may be used instead.

Application platform 38 includes an application setup mechanism 78 that supports application developers' creation and management of applications, which may be saved as metadata into tenant data storage 24 by save routines 76 for execution by subscribers as one or more tenant process spaces 84 managed by tenant management process 86, for example. Invocations to such applications may be coded using PL/SOQL 34 that provides a programming language style interface extension to API 72. A detailed description of some PL/SOQL language embodiments is discussed in commonly owned U.S. Provisional Patent Application 60/828, 192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage relieving application metadata 92 for the subscriber making the invocation and executing the metadata as an application in a virtual machine.

Each HTTP application servers $80_1$-$80_N$ may be communicably coupled to database systems, e.g., having access to system data 34 and tenant data 32, via a different network connection. For example, one HTTP application server 80 might be coupled via the network 20 (e.g., the Internet), another HTTP application servers $80_1$-$80_N$ might be coupled via a direct network link, and another one of HTTP application servers $80_1$-$80_N$ might be coupled by yet a different network connection. Transfer Control Protocol and Internet Protocol (TCP/IP) are typical protocols for communicating between HTTP application servers $80_1$-$80_N$ and database 14. However, it will be apparent to one skilled in the art that other transport protocols may be used to optimize the system depending on the network interconnect used.

In certain embodiments, each of HTTP application servers $80_1$-$80_N$ is configured to handle requests for any user associated with any organization that is a tenant. Because it is desirable to be able to add and remove application servers from the server pool at any time for any reason, there is preferably no server affinity for a user and/or organization to a specific one of HTTP application servers $80_1$-$80_N$. In one embodiment, therefore, an interface system implementing a load balancing function (e.g., an F5 Big-IP load balancer) is communicably coupled between HTTP application servers $80_1$-$80_N$ and the user systems 32 to distribute requests to HTTP application servers $80_1$-$80_N$. In one embodiment, the load balancer uses a least connections algorithm to route user requests to HTTP application servers $80_1$-$80_N$. Other examples of load balancing algorithms, such as round robin and observed response time, also can be used. For example, in certain embodiments, three consecutive requests from the same user 17-19 could hit three different HTTP application servers $80_1$-$80_N$, and three requests from different user systems 32 could hit a common HTTP application server $80_1$-$80_N$. In this manner, server system 30 is multi-tenant, wherein server system 30 handles storage of and access to, different objects, data and applications across disparate users and organizations.

In certain embodiments, user systems 32 (which may be client systems) communicate with HTTP application servers $80_1$-$80_N$ to request and update system-level and tenant-level data from server system 30 that may require sending one or more queries to tenant data storage 24 and/or system data storage 26. Server system 30 (e.g., an application server 80 in server system 30) automatically generates one or more SQL statements (e.g., one or more SQL queries) that are designed to access the desired information. System data storage 26 may generate query plans to access the requested data from the database.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, the present processes may be embodied as a computer program product that includes a machine-readable storage medium (media) having instructions stored thereon/in which can be used to program a computer to perform any of the processes of the embodiments described herein. Computer code for operating and configuring the server system to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.). Therefore, the scope of the appended claims should be accorded the broadest interpretation so as to encompass all such modifications and similar arrangements.

The invention claimed is:

1. A method comprising:
using at least one virtual portal and a plurality of portal display registries (PDRs), a multi-tenant database system to control access to the multi-tenant database and to provide data for multiple tenants in the same physical database object with tenant data arranged so that data corresponding to respective tenants is kept logically separate from that of other tenants so that one tenant does not have access to another tenant's data unless such data is expressly shared, wherein the PDRs coordinate content and resources to be provided to users to provide different levels of access to the tenant data for different users of a single tenant;
configuring one or more of the PDRs that each include one or more exceptions to an experience to be provided to one or more corresponding users to be associated with one of the plurality of tenants such that any one of the plurality of tenants is associated with a portal display registry that is different from the portal display registry associated with the remaining tenants of the plurality of tenants storing in one of the plurality of PDRs information identifying accessible content that may be accessed by the tenant associated therewith and a subpart of the tenant-accessible content that the first tenant user is allowed to access, wherein the experience is a combination of data available via the PDRs and corresponding rendering of the data;
receiving from a first tenant user through a selected portal of the at least one virtual portal, a request to access tenant data corresponding to the first tenant; and
transmitting, via the selected portal, to the first tenant user, data from the sub-portion in response to determining that the sub-portion is not included in the sub-part.

2. The method of claim 1, further comprising permitting a second tenant user to access a second sub-portion of the remaining content through an additional portal, the second sub-portion being defined in an additional portal display registry of the plurality of display registries included with the multi-tenant database system associated with a second tenant of the plurality of tenants.

3. The method of claim 1, wherein receiving further includes comprises from the one of a plurality of tenants, a request to permit additional tenant users to access the sub-portion.

4. The method of claim 1, wherein receiving further comprises receiving from the one of a plurality of tenants, a request to permit additional tenant users to access a segment of the sub-portion, with the at least one first tenant user and the additional tenant users defining a plurality of tenant users, with the information contained in the segment perceived by one of the plurality of tenant users being different from the information contained in the segment perceived by the remaining tenant users of the plurality of tenant users.

5. The method as recited in claim 1, wherein permitting further comprises permitting a second tenant user to perceive a second sub-portion of the remaining content through an additional portal, the second sub-portion being defined in an additional portal display registry included with the multi-tenant database system associated with a second tenant of the plurality of tenants, with the at least one first tenant user accessing the first sub-portion through a uniform resource locator (URL) that is different than a URL through which the second tenant user communicates with the database.

6. The method of claim 1, wherein permitting further comprises:
receiving a communication from the at least one first tenant user requesting access to the sub-portion;
identifying, among the authorized content, the sub-portion;
comparing information in the sub-portion to information contained in the one of a plurality of portal display registries to determine whether information in the sub-portion may be transmitted to the at least one first tenant user; and
sending the information in the sub-portion in response to determining that the at least one first tenant user is authorized to perceive the information in the sub-portion.

7. The method of claim 1, wherein permitting further comprises providing, in the sub-portion, first branding information that is perceivable by the one of a plurality of tenants and allowing further includes providing to the at least one first tenant user second branding information that is defined by the one of a plurality of tenants.

8. The method of claim 1, wherein permitting further comprises providing, in the sub-portion, first branding information that is perceivable by the one of a plurality of tenants and allowing further includes providing to the at least one first tenant user second branding information that is different than the first branding information.

9. The method of claim 1, wherein permitting further includes providing, in the sub-portion, first branding information that is perceivable by the one of a plurality of tenants and allowing further includes providing to a plurality of first tenant users, additional branding information that is different than the first branding information, with the additional branding information perceived by one of the plurality of first tenant users being different from the branding information perceived by the remaining first tenant users of the plurality of first tenant users.

10. A non-transitory machine-readable medium carrying one or more sequences of instructions that, when executed by one or more processors, are configurable to cause the one or more processors to:
use at least one virtual portal and a plurality of portal display registries (PDRs), a multi-tenant database system to control access to the multi-tenant database and to provide data for multiple tenants in the same physical database object with tenant data arranged so that data corresponding to respective tenants is kept logically separate from that of other tenants so that one tenant does not have access to another tenant's data unless such data is expressly shared, wherein the PDRs coordinate content and resources to be provided to users to provide different levels of access to the tenant data for different users of a single tenant;
configure one or more of the PDRs that each include one or more exceptions to an experience to be provided to one or more corresponding users to be associated with one of the plurality of tenants such that any one of the plurality of tenants is associated with a portal display registry that is different from the portal display registry associated with the remaining tenants of the plurality of tenants storing in one of the plurality of PDRs information identifying accessible content that may be accessed by the tenant associated therewith and a subpart of the tenant-accessible content that the first tenant user is allowed to access, wherein the experience is a combination of data available via the PDRs and corresponding rendering of the data;
receive from a first tenant user through a selected portal of the at least one virtual portal, a request to access tenant data corresponding to the first tenant; and
transmit, via the selected portal, to the first tenant user, data from the sub-portion in response to determining that the sub-portion is not included in the sub-part.

11. The non-transitory machine-readable medium as recited in claim 10, further including instructions that, when executed by the one or more processors, are configurable to cause the one or more processors to:
permit a second tenant user to access a second sub-portion of the remaining content through an additional portal, the second sub-portion being defined in an additional portal display registry of the plurality of display registries included with the multi-tenant database system associated with a second tenant of the plurality of tenants.

12. The non-transitory machine-readable medium as recited in claim 10, further including instructions that, when executed by the one or more processors, are configurable to cause the one or more processors to:
allow a plurality of first tenant users to access a segment of the sub-portion, with the information contained in the segment perceived by one of the plurality of first tenant users being different from the information contained in the segment perceived by the remaining first tenant users of the plurality of tenant users.

13. The non-transitory machine-readable medium as recited in claim 10, further including instructions that, when executed by the one or more processors, are configurable to cause the one or more processors to:
permit a second tenant user to perceive a second sub-portion of the remaining content through an additional portal, the second sub-portion being defined in an additional portal display registry included with the multi-tenant database system associated with a second tenant of the plurality of tenants, with the at least one first tenant user accessing the first sub-portion through a uniform resource locator (URL) that is different than a URL through which the second tenant user communicates with the database.

14. The non-transitory machine-readable medium as recited in claim 10, further including instructions that, when executed by the one or more processors, are configurable to cause the one or more processors to:
receive a communication from the at least one first tenant user for access to the sub-portion;
identify, among the authorized content, the sub-portion;
compare information in the sub-portion to information contained in the one of a plurality of portal display registries to determine whether information in the sub-portion may be transmitted to the at least one first tenant user; and
send the information in the sub-portion in response to determining that the at least one first tenant user is authorized to perceive the information in the sub-portion.

15. An apparatus for controlling access to a multi-tenant database system using a virtual portal, the multi-tenant database system to store data for multiple tenants in the same physical database object with tenant data arranged so that data corresponding to respective tenants is kept logically separate from that of other tenants so that one tenant does not have access to another tenant's data unless such data is expressly shared, the apparatus comprising:
one or more processors; and
at least one memory device coupled to the one or more processors, the at least one memory device storing sequences of instructions which, when executed by the processor, cause the processor to:
use at least one virtual portal and a plurality of portal display registries (PDRs), a multi-tenant database system to control access to the multi-tenant database and to provide data for multiple tenants in the same physical database object with tenant data arranged so that data corresponding to respective tenants is kept logically separate from that of other tenants so that one tenant does not have access to another tenant's data unless such data is expressly shared, wherein the PDRs coordinate content and resources to be provided to users to provide different levels of access to the tenant data for different users of a single tenant;
configure one or more of the PDRs that each include one or more exceptions to an experience to be provided to one or more corresponding users to be associated with one of the plurality of tenants such that any one of the plurality of tenants is associated with a portal display registry that is different from the portal display registry associated with the remaining tenants of the plurality of tenants storing in one of the plurality of PDRs information identifying accessible content that may be accessed by the tenant associated therewith and a subpart of the tenant-accessible content that the first tenant user is allowed to access, wherein the experience is a combination of data available via the PDRs and corresponding rendering of the data;

receive from a first tenant user through a selected portal of the at least one virtual portal, a request to access tenant data corresponding to the first tenant; and transmit, via the selected portal, to the first tenant user, data from the sub-portion in response to determining that the sub-portion is not included in the sub-part.

16. The apparatus as recited in claim 15, further including instructions that, when executed by the one or more processors, are configurable to cause the one or more processors to:

permit a second tenant user to access a second sub-portion of the remaining content through an additional portal, the second sub-portion being defined in an additional portal display registry of the plurality of display registries included with the multi-tenant database system associated with a second tenant of the plurality of tenants.

17. The apparatus as recited in claim 15, further including instructions that, when executed by the one or more processors, are configurable to cause the one or more processors to:

allow a plurality of first tenant users to access a segment of the sub-portion, with the information contained in the segment perceived by one of the plurality of first tenant users being different from the information contained in the segment perceived by the remaining first tenant users of the plurality of tenant users.

18. The apparatus as recited in claim 15, further including instructions that, when executed by the one or more processors, are configurable to cause the one or more processors to:

permit a second tenant user to perceive a second sub-portion of the remaining content through an additional portal, the second sub-portion being defined in an additional portal display registry included with the multi-tenant database system associated with a second tenant of the plurality of tenants, with the at least one first tenant user accessing the first sub-portion through a uniform resource locator (URL) that is different than a URL through which the second tenant user communicates with the database.

19. The apparatus as recited in claim 15, further including instructions that, when executed by the one or more processors, are configurable to cause the one or more processors to:

receive a communication from the at least one first tenant user for access to the sub-portion;

identify, among the authorized content, the sub-portion;

compare information in the sub-portion to information contained in the one of a plurality of portal display registries to determine whether information in the sub-portion may be transmitted to the at least one first tenant user; and send the information in the sub-portion in response to determining that the at least one first tenant user is authorized to perceive the information in the sub-portion.

* * * * *